United States Patent Office 3,563,780
Patented Feb. 16, 1971

3,563,780
PROCESS FOR PRESERVING FLOWERS
John C. Waszkiewicz, Jr., Middle Settlement Road,
New Hartford, N.Y. 13413
No Drawing. Continuation-in-part of application Ser. No. 619,055, Feb. 27, 1967. This application Sept. 9, 1969, Ser. No. 856,500
Int. Cl. A01n 3/00, 3/02
U.S. Cl. 117—3.0
2 Claims

ABSTRACT OF THE DISCLOSURE

A process for preserving flowers in which a fresh flower is first dried by burying it in dry silica gel. The dried flower is then dipped in a solution of an ester-type acrylic resin and a solvent and air dried. No further protective coating or additional color-preservative is required.

CROSS-REFERENCE TO RELATED APPLICATION

This application is a continuation-in-part of application Ser. No. 619,055, filed Feb. 27, 1967, by the applicant herein for Process For Preserving Flowers, now abandoned.

BACKGROUND OF THE INVENTION

This invention relates to a method of preserving flowers by drying fresh flowers and dipping them in a solution having a clear, flexible, plastic material therein.

The processes disclosed in Fessenden Pat. Nos. 2,567,929; 2,606,853; 2,658,836; and 2,698,809 are directed toward preserving the natural colors and shapes of dead flowers, leaves, insects and the like, the end goal being the retention of a life-like and natural appearance in a normally unstable or impermanent object. The coloring substance of the specimen, according to the teachings of the above named prior art patents, is first stabilized and preserved and then the specimen in its dried and fragile condition is carefully embedded in, impregnated or coated with plastic material.

SUMMARY OF THE INVENTION

The present invention contemplates the drying of fragile specimens such as flowers, without adding a specific color preservative, or without a color-restoring step, and then dipping the dried flower in a clear and flexible plastic and allowing the plastic to dry at room temperature.

The primary object of the invention is to provide a simple but effective method of treating a fresh flower to form a preserved flower unchanged in appearance.

Another important object is to provide such a method using materials which are readily and commercially available.

A further important object is to provide such a method which is particularly adapted for preserving the passionflower.

DESCRIPTION OF THE PREFERRED EMBODIMENT

After selecting a fresh flower to be preserved, the selected flower is buried in dry silica gel ($SiO_2$) for a period of five to seven days. Considerable latitude is allowable in the particle size of the silica gel, a size roughly equivalent to that of ground or granulated sugar has been found to be satisfactory.

After the drying period, the flower is carefully removed and shaken to remove any powdered matter retained by it, and then it is dipped into a room temperature solution of ester-type acrylic resin dissolved in a solvent. An acrylic plastic which dries to the desired clear flexible state at low temperatures is methyl methacrylate which is commercially available under the trade name "Acryloid" from Rohm & Haas Co., Inc., Philadelphia, Pa. This acrylic resin, when dissolved in toluene ($C_6H_5 \cdot CH_3$), in the proportions of 40% of the plastic to 60% by weight of the solvent, has been found to be of a consistency suitable for coating the flower to the desired depth of coating material.

To prevent a too shiny finished appearance, a flattening agent may also be added to the solution of plastic and solvent. A silicon dioxide ($SiO_2$) flattening agent which is 99.5% pure $SiO_2$ of 3.3 microns diameter particle size, is commercially obtainable under the trade name "Syloid" from W. R. Grace & Co., New York, N.Y., and has been found effective when added to the solution in the proportion of two to ten percent by weight of the solution.

After dipping the flower in the toluene-acrylic resin solution, to which the flattening agent has been added, the flower is hung to dry at room temperature for about 24 hours. A temperature of about 70° to 75° F. has been found to be effective for enabling the plastic to dry as a clear and flexible coating which transforms the fresh flower into a preserved flower of completely natural appearance.

The above described method, with some modification, has been found to be particularly well adapted for preserving the passionflower (Passiflora Incarnata) which is very advantageous and desirable because of the flower's unusual beauty and very short life. Thus, the passionflower bloom opens in the morning and closes and dies by evening of the same day with the result than many people have never seen one.

In applying the method to passionflowers, the flowers are picked in their freshest hours, between 10 a.m. and 3 p.m., and immediately hardened with cold water in an airtight or watertight container. The hardening is accomplished by chilling the flowers down to approximately 40° F. submerged in water and they are maintained in this condition, in the airtight container for 24 to 48 hours, which range is not critical.

After hardening, the flowers are mounted upright in holes in a fixture board and dried with silica gel substantially as previously described. The silica gel is carefully poured around the flowers and, as in pouring water into a receptacle, it builds up from the bottom and completely envelops them. The drying period is for a minimum of two days, and the widest possible temperature range is from 40° to 120° F. Preferably, the drying step is done at a temperature near 78° F. with the relative humidity in the range of 40–50%.

Following the drying period, the flowers are removed from the silica gel and dipped in a solution sold commercially under the name "Cuprinol" by Cuprinol, Inc. This solution is comprised of:

| | Percent |
|---|---|
| Active ingredients— | |
|     Zinc napthenate | 24.00 |
|     Dieldrin | .50 |
| Inert ingredients | 75.50 |

The flowers are immersed in the solution until thoroughly saturated, preferably at room temperature although the temperature and relative humidity are not critical during this step. The Cuprinol impregnates the fibers of the flowers and in so doing prevents or retards water absorption. In addition, the solution prevents the fibers from becoming too brittle which helps prolong the life of the preserved flowers.

After being dipped in the Cuprinol, the flowers are air dried for at least 24 hours in a conditioned area where the temperature is preferably 78° F. and the relative humidity 45%. Following this step, the flowers are dipped in a toluene-acrylic resin solution substantially as described above. Preferably, for the passionflowers, the solution is at a temperature of 60° F. and has a reading of 20 on the Baumé scale. The time for this step is not critical as long as there is complete saturation of the flowers.

The flowers are then air dried, preferably at a temperature of 78° F. and 45% relative humidity, for a minimum of two hours and thereafter the step of dipping in a toluene-acrylic resin solution is repeated with the solution now including the Syloid flattening agent. The two dipping steps just described can be combined as one with almost as pleasing a result. Following the second dipping, or the first if there is but one, the flowers are air dried for a minimum of 24 hours in the conditioned area wherein the temperature is preferably 78° F. and the relative humidity 45% which completes the preservation process.

As will be apparent to those familiar with the art, the invention may be embodied in other specific forms without departing from the spirit or essential characteristics thereof.

I claim:
1. The method of preserving flowers for display consisting of the steps:
   (A) Placing a selected fresh flower on a support and slowly and carefully pouring dry silica gel of a particle size roughly equivalent to that of granulated sugar completely around the flower and leaving it in the silica gel for a period of two to five days;
   (B) then removing the dried flower and gently shaking it free of silica gel and dipping it in a toluene-acrylic resin solution comprising substantially 40% by volume of methyl methacrylate and 60% of toluene solvent at room temperature, to which solution has been added 2–10% by weight of a flattening agent comprising silicon dioxide;
   (C) then air-drying the resin-coated flower for about 24 hours at substantially room temperature, the relative humidity being in the range 40–50%.
2. The method of preserving short-lived and delicate flowers for display consisting of the steps:
   (A) Hardening a selected fresh flower immediately after picking by chilling at approximately 40° F. by means of cold water in a container for 24–48 hours;
   (B) then placing the chilled flower on a support and slowly and carefully pouring dry silica gel of a particle size roughly equivalent to that of granulated sugar completely around the flower and leaving it in the silica gel for 2–5 days;
   (C) then removing the dried flower and gently shaking it free of silica gel and placing it in a water absorption retardant comprising a solution containing a minor portion of zinc napthenate and a major portion of inert ingredients until the flower is thoroughly saturated;
   (D) then removing the treated flower from the retardant solution and drying it at room temperature for at least 24 hours;
   (E) then dipping the dry flower in a toluene-acrylic resin solution comprising substantially 40% by volume of methyl methacrylate and 60% of toluene solvent at room temperature, to which solution has been added 2–10% by weight of a flattening agent comprising silicon dioxide;
   (F) then air-drying the resin-coated flower for about 24 hours at substantially room temperature, the relative humidity being in the range 40–50%.

References Cited

UNITED STATES PATENTS

| | | | |
|---|---|---|---|
| 2,567,929 | 9/1951 | Fessenden | 117—3 |
| 2,606,843 | 8/1952 | Fessenden | 117—3 |
| 2,658,836 | 11/1953 | Fessenden | 117—3 |
| 2,819,973 | 1/1958 | Robbins | 117—3UX |
| 2,906,636 | 9/1959 | Hoivik | 117—3 |
| 3,089,280 | 5/1963 | Klaas | 117—3X |

FOREIGN PATENTS

| | | | |
|---|---|---|---|
| 3,632 | 11/1868 | Great Britain | 117—3 |
| 12,835 | 7/1901 | Great Britain | 117—3 |
| 6,969 | 5/1922 | Netherlands | 117—3 |

OTHER REFERENCES

Art Interchange, vol. 26, p. 30, published 1891.

WILLIAM D. MARTIN, Primary Examiner

H. J. GWINNELL, Assistant Examiner